United States Patent [19]

Miller et al.

[11] Patent Number: 4,466,889

[45] Date of Patent: Aug. 21, 1984

[54] POLYVALENT METAL ION CHELATING AGENTS FOR XANTHAN SOLUTIONS

[75] Inventors: James W. Miller, Mystic; Bryce E. Tate, Niantic, both of Conn.

[73] Assignee: Pfizer Inc.

[21] Appl. No.: 294,593

[22] Filed: Aug. 20, 1981

[51] Int. Cl.³ ............................................. C09K 3/00
[52] U.S. Cl. ................................. 252/8.55 D; 166/246
[58] Field of Search .................... 252/8.55 D, 8.55 R; 166/246, 305 R; 536/114

[56] References Cited

U.S. PATENT DOCUMENTS

| | | | |
|---|---|---|---|
| 3,214,235 | 10/1965 | Wesp et al. | 536/114 |
| 3,343,601 | 9/1967 | Pye | 166/42 |
| 3,801,502 | 4/1974 | Hitzman | 252/8.55 D |
| 3,804,173 | 4/1974 | Jennings | 252/8.55 D |
| 4,036,300 | 7/1977 | Holm et al. | 252/8.55 D |
| 4,119,546 | 10/1978 | Wernau | 166/246 |
| 4,218,327 | 8/1980 | Wellington | 252/8.55 D |
| 4,266,610 | 5/1981 | Meister | 252/8.55 D |
| 4,296,203 | 10/1981 | Wernau | 252/8.55 D |
| 4,353,805 | 10/1982 | Kragen et al. | 252/8.55 D |

FOREIGN PATENT DOCUMENTS 2038859   7/1980   United Kingdom .......... 252/8.55 D

OTHER PUBLICATIONS

Pfizer Technical Bulletin No. 97 "Pfizer Products for Petroleum Production".
Johansen, R. T. et al. "Detergent and Citric Acid Clean-Out Procedure", *Producers Monthly*, Dec. 1957.
Lipton, Daniel, "Improved Injectability of Biopolymer Solutions" SPE Paper No. 5099, 1974.

*Primary Examiner*—Stephen J. Lechert, Jr.
*Assistant Examiner*—Howard J. Locker
*Attorney, Agent, or Firm*—Charles J. Knuth; James H. Monroe

[57] ABSTRACT

A stable xanthan solution with superior filterability and subterranean injectivity characteristics comprising biopolymer and a chelating agent selected from aliphatic alpha-hydroxy acids having from about 2-7 carbon atoms; aliphatic and aromatic beta-keto compounds having from about 4-9 carbon atoms; or 2- and 4-pyrones having a hydroxyl group alpha to the carbonyl and having 5 or 6 carbon atoms; said chelating agent being present in an amount of at least about 1.0 ppm of the total solution. A method of enhancing oil recovery comprising employing as a mobility control solution in oil-bearing formations a mixture of xanthan biopolymer and a chelating agent is also disclosed.

6 Claims, 4 Drawing Figures

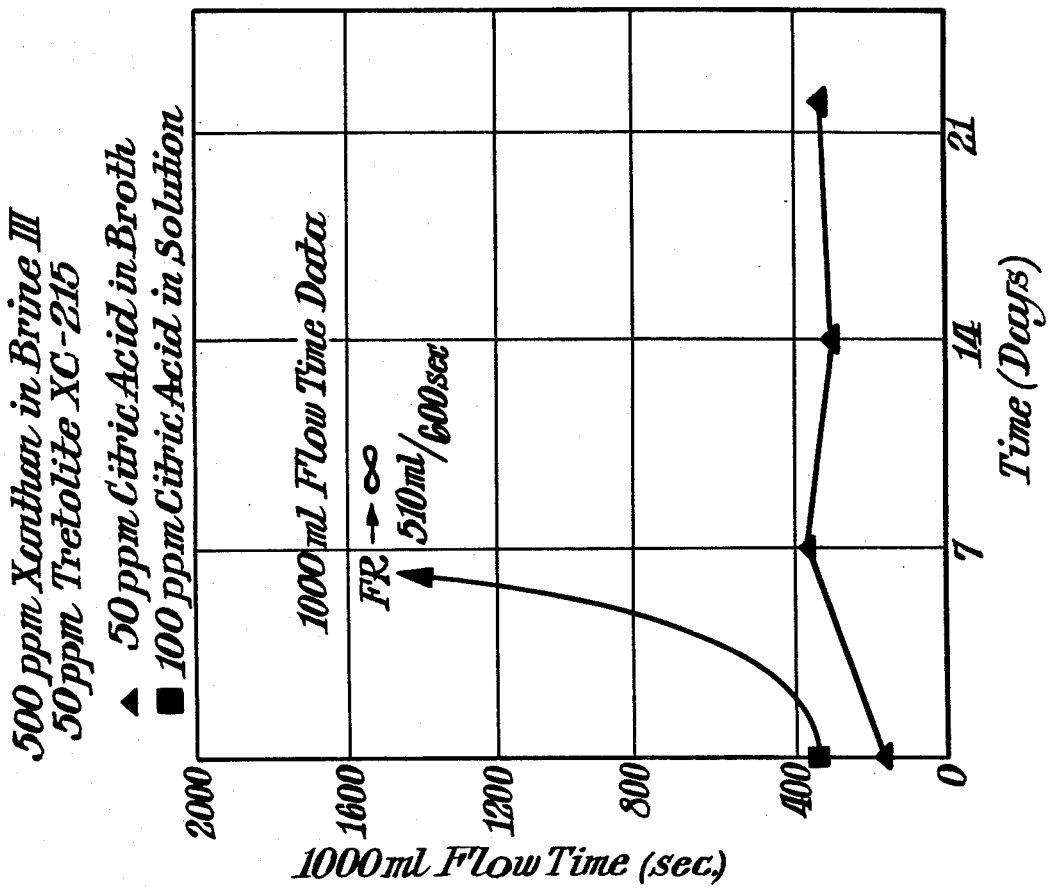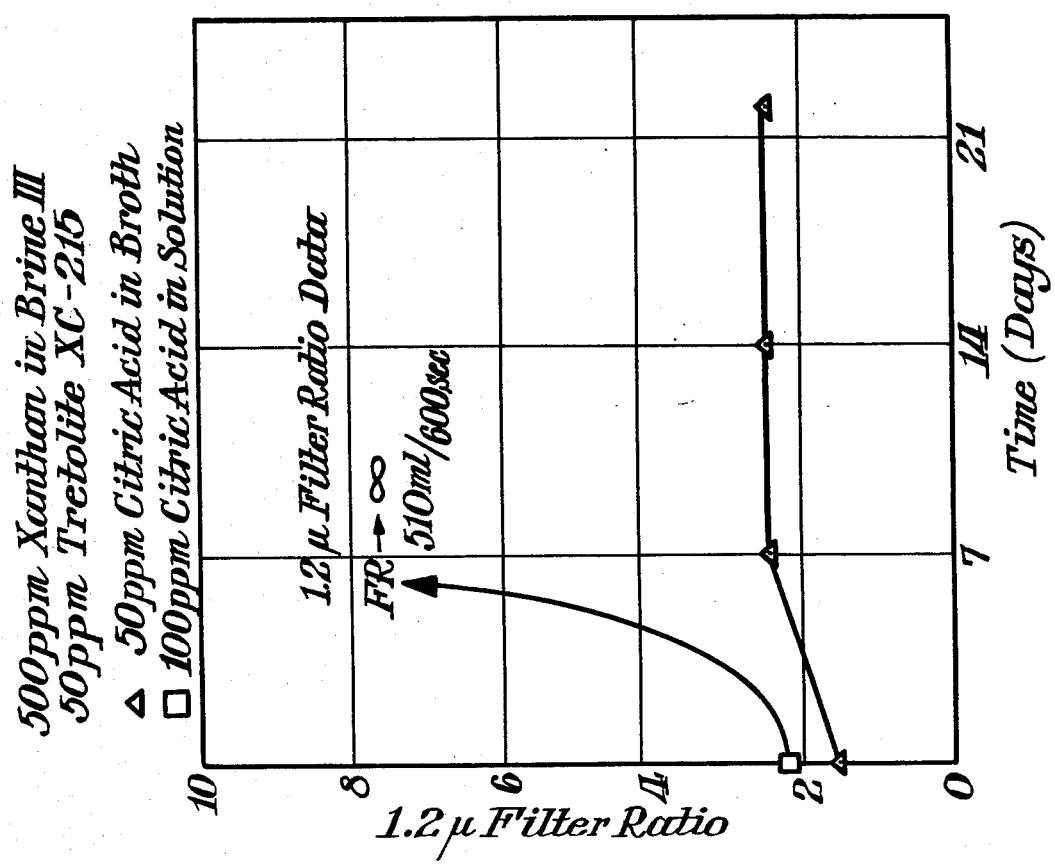

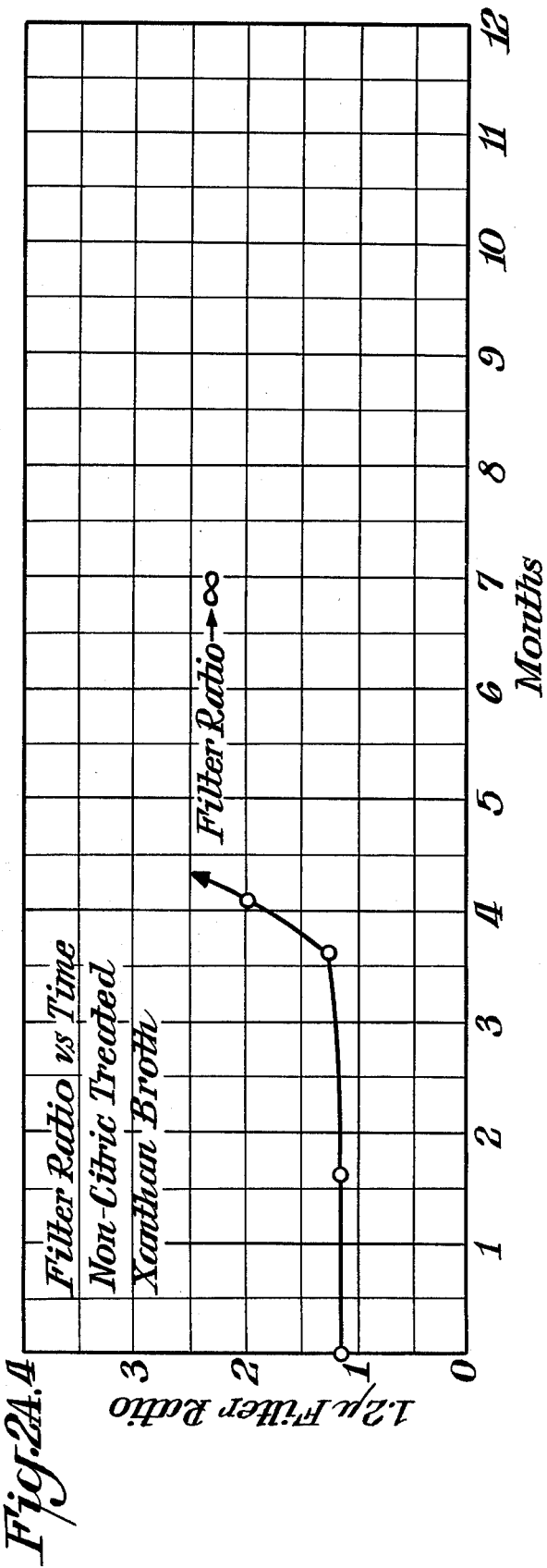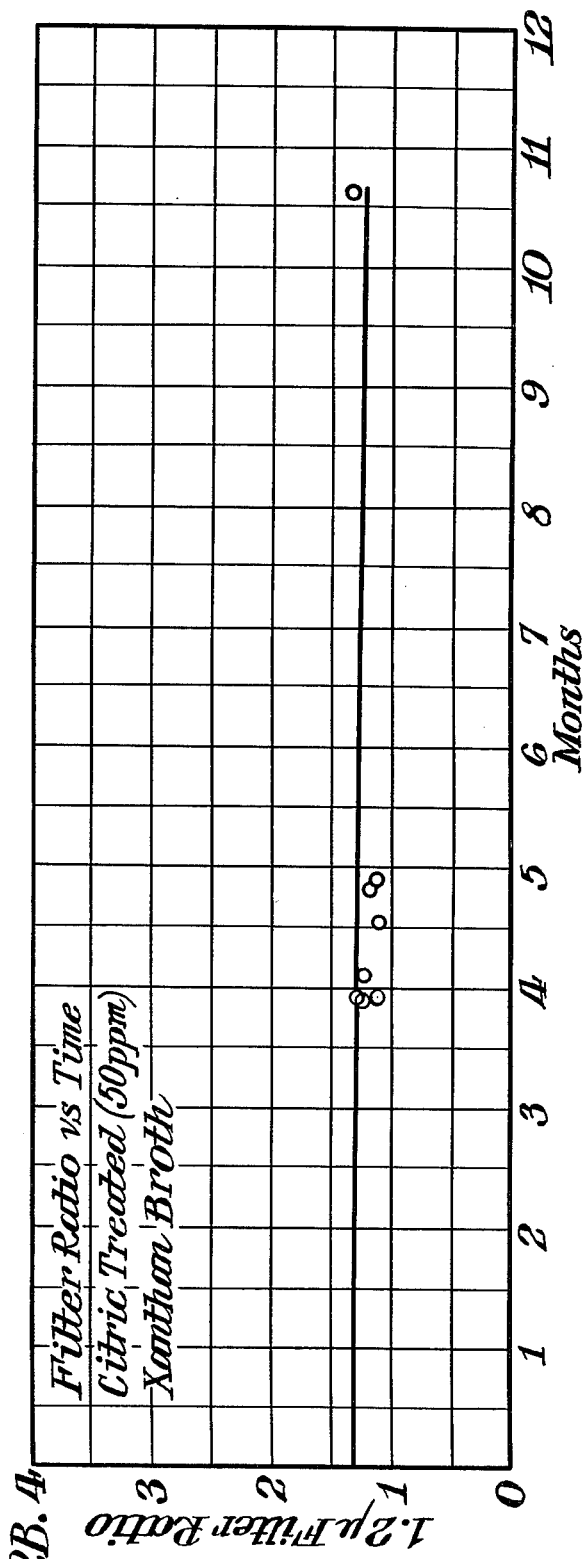

POLYVALENT METAL ION CHELATING AGENTS FOR XANTHAN SOLUTIONS

BACKGROUND OF THE INVENTION

The hydrophilic colloids produced by Xanthomonas species are polysaccharides which contain mannose, glucose, glucuronic acid, O-acetal radicals and acetal-linked pyruvic acid. These gums and their derivatives have found wide food and industrial applications. Of special interest is the increasing focus on the use of Xanthomonas gums in displacement of oil from partially depleted reservoirs.

Typically, oil is recovered from underground reservoirs via a series of sequential operations. A new well will generally produce a limited amount of oil as a result of release of internal pressure in the well. As this pressure becomes depleted, it is necessary to pump further quantities of oil by mechanical means. These measures recover only about 25% or less of the total oil stored in the reservoir. A great deal of oil is still trapped within the pores of the formation. Further enhancement of recovery can then be effected by secondary methods. In one method of recovery, a waterflood is carried out by pumping water into a well or series of wells, displacing part of the trapped oil from the porous rock and collecting the displaced oil from surrounding wells. However, waterflooding still leaves about 55-60% of the available oil trapped in the formation. The explanation for this is that the water has a very low viscosity compared to the crude oil and tends to follow the path of least resistance, fingering through the oil and leaving large pockets untouched. In addition, surface forces in the formation tend to bind the oil and prevent its displacement.

A number of processes have been developed in recent years to recover further quantities of oil from these reservoirs by the use of mobility control solutions which enhance oil displacement by increasing the viscosity of the displacing fluid, and as a consequence, the mobility of reservoir oil. Of interest are those enhanced recovery processes employing polymer flooding with a polysaccharide or polyacrylamide to increase the viscosity of the displacing fluid. Variations of this process include the use of surfactants and co-surfactants to release the oil from the rock formation. Polyacrylamides have been found to suffer such deficiencies as viscosity loss in brines and severe shear sensitivity. Since, as was well documented in the prior art, xantham gum is relatively insensitive to salts (does not precipitate or lose viscosity under normal conditions), is shear stable, thermostable and viscosity stable over a wide pH range, xanthan gum is a good displacing agent. Moreover, the gum is not extensively adsorbed on the elements of the porous rock formations and it gives viscosities useful in enhanced oil recovery (5 to 100 centipoise units at 7.3 sec.$^{-1}$ shear rate) at low concentrations (100 to 3000 ppm). The use of solutions of xanthan gum or derivatives of xanthan gum for oil recovery is described in U.S. Pat. Nos. 3,243,000; 3,198,268; 3,532,166; 3,305,016; 3,251,417; 3,319,606; 3,319,715; 3,373,810; 3,434,542; 3,729,460 and 4,119,546. It is suggested in U.S. Pat. No. 3,305,016 that aqueous solutions containing heteropolysaccharide in sufficient quantity to increase the viscosity be employed as the thickening agent in preparing viscous waterflooding solutions. The polysaccharide may be prepared, separated, purified and then added. Alternatively, according to this reference, the entire culture after adding a bactericide (e.g., formaldehyde) to kill the bacteria, may be added to the flood water.

It has been found that various heat treatments result in enhanced viscosities or filterability of whole and diluted Xanthomonas fermentation broths. U.S. Pat. No. 3,501,578 provides that a heat step is carried out prior to the precipitation of xanthan. Viscosity increases of 1.5 to 3.5 fold are obtained in the heat-treated broth. U.S. Pat. No. 3,773,752 describes a process for heating diluted fermentation broth after addition of an alkali metal salt until coagulation occurs and filtering the hot solution preferably after the addition of a coagulating agent such as alum. The process of U.S. Pat. No. 3,801,502 calls for the addition of an alcohol, phenol, ketone or non-ionic surfactant during the heating process. In the process of U.S. Pat. No. 3,355,447, the heat-treated fermentation broth is diluted, filtered and the xanthan removed by alcohol precipitation.

In spite of this advanced state of technology, a difficult problem remained unsolved; i.e. xanthan biopolymer has carboxyl groups which can serve as cross-linking sites for polyvalent metal ions such as iron, magnesium and calcium. These metal ions are commonly found in oil-bearing formation waters. The result of this crosslinking is biopolymer immobilization and formation plugging due to a gelation mechanism. Oil production is thus reduced because the xanthan cannot readily migrate through the rock formation. Cell matter from the Xanthomonas organism is present to varying extents in xanthan gum. This material also tends to plug the formation. In broth forms of the gum, native cells plug to a much lesser degree. As polyvalent ions such as iron and calcium increase in concentration in field brine, the native cells can plug. It is believed that this is due to cross-linking of xanthan on the surface of the cells which has not yet been released into solution. It is the present invention that for the first time presents a solution to these economically significant problems.

SUMMARY OF THE INVENTION

The present invention comprises a stable xanthan solution with superior filterability and subterranean injectivity characteristics comprising xanthan biopolymer and a chelating agent selected from:

A. aliphatic alpha-hydroxy acids or salts thereof having from about 2-7 carbon atoms;

B. aliphatic and aromatic beta-keto acids or salts thereof or beta-diketones having from about 4-9 carbon atoms; or C. 2- and 4- pyrones having a hydroxyl group alpha to the carbonyl and having 5 or 6 carbon atoms; said chelating agent being present in an amount of at least about 1.0 ppm of the total solution. The product of this invention is preferably employed as a mobility control solution for use in oil recovery.

The solution is preferred in which the chelating agent is an aliphatic alpha-hydroxy acid having from about 2-7 carbon atoms; citric acid is especially preferred. The solution wherein the chelating agent is employed in an amount of from about 1.0-1000 ppm of the total solution is preferred as is the solution wherein the xanthan biopolymer is in the form of a fermentation broth containing cells of an organism belonging to the genus Xanthomonas.

A method of oil recovery comprising employing as a mobility control solution in oil-bearing formations a mixture of xanthan biopolymer and a chelating agent as described above is also a part of this invention.

DETAILED DESCRIPTION OF THE INVENTION

Active chelating agents have been identified by a screening method using Ca (+2)—containing water; the criterion of activity was improved filterability through 1.2 micron Millipore filters. Present evidence suggests that the screen also likely predicts effectiveness in controlling the other alkaline earth cations likely to be encountered, Mg (+2), Sr (+2), and Ba (+2), and as well as Fe (+3).

The general test procedures employed were as follows:

Synthetic Test Brines—Brines I-V were prepared using distilled water as outlined in Table I. The brines were filtered through 0.2 micron Amicon® membranes prior to use to remove any microbial growth or other particulate matter.

Solution Preparation—A 5000 ppm xanthan stock solution, prepared with the test brine, was sheared for 2 minutes at 50 volts in a Waring blender set at its maximum speed. The solution was then diluted to 500 ppm with the test brine and sheared for 1 minute at 50 volts.

Filter Ratio Test/Viscosity Assay—Filter ratio tests were used as a measure of injectivity of xanthan solutions. One liter of a xanthan test solution was filtered through 5 or 1.2 micron Millipore membranes under 40 psi of pressure. Filter ratio is defined as:

$$FR = \frac{t_{1000\ ml} - t_{750\ ml}}{t_{250\ ml}}$$

where t is the flow time in seconds of the indicated volume (ml) of filtrate which is collected in a 1000 ml graduated cylinder. 5 and 1.2 micron Millipore filters were used to simulate high and moderate porosity oil-bearing reservoirs, respectively. As the test solution exhibits progressively improved injectivity upon treatment with a chelating agent, the filter ratio decreases, approaching 1.

Xanthan types and chelating agents which are operable under this invention are those, which when used as indicated, exhibit improved filterability as defined by:

$$R = \frac{\text{Filter Ratio with Chelant}}{\text{Filter Ratio without Chelant}}$$

$R \leq 0.7$; significant improvement
$0.7 < R < 1.0$; limited improvement
$R \geq 1.0$; no improvement.

Unless otherwise indicated, xanthan content is given on a viscosity assay basis. This assay is defined such that a 500 ppm xanthan solution prepared in 500 ppm total salt (9:1 $NaCl/CaCl_2$) will yield a 10 cps Brookfield viscosity at 6 rpm with a UL adapter at room temperature.

Many times citric treatment of broth followed by addition of citric to dilute solutions can result in even greater enhancement in filterability. This is especially evident in brine above a pH of 7 and in solutions containing Fe (+3).

In the practice of this invention, a suitable fermentation medium such as is taught in U.S. Pat. No. 4,119,546 is inoculated with an organism of the genus Xanthomonas. The inoculum medium may be YM Broth (Difco) or a medium containing crude glucose (cerelose), sodium and potassium phosphates, magmesium sulfate and any of a variety of organic sources of nitrogen such as an enzymatic digest of soybean (Soy Peptone Type T, Humko-Sheffield Chemical Co.) or an enzymatic digest of casein (NZ-Amine YT, Humko-Sheffield Chemical Co.). After aerobic propagation for about 30 hours at 28° C., an aliquot is transferred to a fermentor for the second stage inoculum.

A suitable carbohydrate is present in the nutrient medium at a concentration from about 1 to about 5% by weight. Suitable carbohydrates include, for example, glucose, sucrose, maltose, fructose, lactose, processed inverted beet molasses, invert sugar, high quality filtered thinned starch or mixtures of these carbohydrates. The preferred carbohydrates are glucose, maltose, fructose, filtered starch hydrolysates or mixtures thereof.

Inorganic nitrogen is present in the nutrient medium at a concentration of about 0.02 to about 35% by weight, preferably 0.07 to 0.25% by weight. Inorganic nitrate is the prefered nitrogen source; ammonium nitrate at about 1 gram/liter, sodium nitrate at about 2 grams/liter or potassium nitrate at about 2.4 grams/liter may be used. The preferred source of nitrogen in this as well as the production medium is inorganic. However, organic nitrogen sources can also be used although they enhance large Xanthomonas cell formation, provided the overall requirement of substantial freedom from insoluble materials with a particle size about about 3 microns is maintained.

Magnesium in the form of $MgSO_4.7H_2O$ or epsom salts, 0.1 to 1.0 grams/liter, is added along with trace manganese and iron ions. A chelating agent such as ethylenediaminetetraacetic acid or preferably citric acid which functions as a growth promoting Krebs cycle acid and sequestering agent for any calcium present is added.

Sufficient mono- and dipotassium phosphates are added to buffer the medium at about pH 5.9 to 8.5, preferably 6.0 to 7.5. After aerobic propagation for about 20-40 hours at 24° to 34° C., preferably 28°-30° C., an aliquot is transferred to a fermentor containing the production medium.

The production medium is similar in composition to that of the second stage inoculum medium with the exception that sodium phosphates are preferably used in place of potassium phosphates because of their lower costs and a small amount of calcium in the form of a salt such as calcium chloride or calcium nitrate or oxide such as lime is added to increase xanthan yield. The amount of calcium added is dependent on the amount of calcium present in the water used for medium make-up, the nitrogen source used and the species and strain of Xanthomonas organism employed. When sodium nitrate or potassium nitrate is used in place of ammonium nitrate, less calcium is required (approximately 27 ppm). Deionized water, distilled water or water containing less than about 20 ppm of calcium and other phosphate precipitate cations may also be used for medium make-up. Calcium ions may be added to a desired concentration. The role of calcium ions in the enhancement of xanthan production is an important one but critical to the process of the present invention is the prevention of the precipitation of excess calcium cations and other cations as insoluble phosphate salts. This is accomplished, when desired, by the addition of a chelating agent such as ethylenediaminetetraacetic acid or other suitable compound known to those skilled in the art at a concentration of about 1 to 20 millimolar, preferably 2 to 8 millimolar.

The pH of the fermentation medium is quite important to suitable growth of the Xanthomonas bacteria. The preferred range is about 6.0 to 7.5. Control of the pH within this range can be obtained by the use of a buffer compound such as disodium acid phosphate. Ethylenediaminetetraacetic acid or other suitable chelating agent is also added in the buffer solution used for pH control to prevent the precipitation of calcium ions introduced in the water used for medium make-up as insoluble calcium salts. The pH is preferably controlled during the fermentation cycle by the addition of sodium or potassium hydroxide solution which has the added advantages of decreasing broth viscosity without affecting xanthan yield and the elimination of the need for chelation of the buffer solution.

In order to obtain a rapid fermentation, it is essential to have the correct amount of oxygen available for the growing bacterial culture. The fermentation medium is aerated to provide sufficient oxygen to produce a sulfite oxidation value within the range of about 1.5 to about 3.5 millimoles of oxygen per liter per minute. A description of sulfite oxidation value is set forth in Industrial Engineering Chemistry 36, 504 (1936). The sulfite oxidation value is a measure of the rate of oxygen uptake in the fermentor under the agitation and aeration conditions employed.

The fermentation is allowed to proceed at a temperature of about 30° C. until the broth has a xanthan concentration of at least about 100 ppm, preferably at least about 1.0% and more preferably at least about 1.4% (30–96 hours). Viscosities of the broth are typically at least about 4,000 centipoise units and preferably at about 7,000 centipoise units.

It is desirable to kill the microbial cells by the addition of a bactericide such as formaldehyde, glutaraldehyde, phenol or substituted phenol such as a cresol or hydroxybenzene or a polyhalogenated phenol such as Corexit (Exxon Corporation), or any other preservative well known in the art. The preferred preservative is formaldehyde at a concentration of from about 200 to 10,000 ppm, preferably about 1000 to 3000 ppm, which can be added to the final fermentation broth before or during storage.

The process of this invention works well for many of the various species of Xanthomonas bacteria. Illustrative species include *Xanthomonas phaseoli, Xanthomonas malvacearum, Xanthomonas carotae, Xanthomonas begoniae, Xanthomonas incanae* and *Xanthomonas vesicatoria.* The preferred species is *Xanthomonas campestris.*

TABLE I

| Examples of synthetic oil field brines | |
|---|---|
| Component | Amount, mg/kg of final brine |
| Brine No. I. High salt, high hardness | |
| NaCl | 64,200 |
| $CaCl_2$ | 5,500 |
| $MgCl_2.6H_2O$ | 7,230 |
| $NaHCO_3$ | 135 |
| $BaCl_2.2H_2O$ | 92 |
| Brine No. II. Low salt, moderate hardness | |
| NaCl | 200 |
| $Na_2SO_4$ | 210 |
| $MgCl_2.6H_2O$ | 800 |
| $CaSO_4.2H_2O$ | 2,770 |
| $NaHCO_3$ | 940 |
| Brine No. III. Moderate salt, moderate hardness | |
| NaCl | 6,849 |
| $CaCl_2$ | 386 |

TABLE I-continued

| Examples of synthetic oil field brines | |
|---|---|
| Component | Amount, mg/kg of final brine |
| $MgCl_2.6H_2O$ | 640 |
| $MgSO_4.7H_2O$ | 14 |
| $NaHCO_3$ | 232 |
| $BaCl_2.2H_2O$ | 13 |
| Brine No. IV. Low salt, moderate hardness | |
| $CaSO_4.2H_2O$ | 596 |
| $MgSO_4.7H_2O$ | 558 |
| $CaCl_2$ | 114 |
| $NaHCO_3$ | 292 |
| Brine No. V. Low salt, moderate hardness | |
| $CaCl_2$ | 1,785 |
| $Na_2SO_4$ | 1,933 |
| $NaHCO_3$ | 941 |
| $MgSO_4.7H_2O$ | 976 |

EXAMPLE 1

Citric Treatment of Dilute Xanthan Solutions Containing Ca (+2)

Trisodium citrate dihydrate was added to the dilution brine consisting of 500 ppm NaCl containing 2770 ppm $CaCl_2$ (1000 ppm $Ca^{+2}$). The chelating agent was added to give concentrations equivalent to 1,000, 3,000 and 5,000 ppm of citric acid; i.e., a citric acid (molecular weight=192) concentration of 1,000 ppm was prepared by adding 1531 ppm of trisodium citrate dihydrate (molecular weight=294).

Using these citric treated brines, 500 ppm xanthan test solutions (Flocon Biopolymer) were prepared in a Waring blender, followed by pH adjustment to 6–7 with either lN NaOH or HCl. The Brookfield viscosity was then measured at 6 rpm using a UL adapter, and the 1.2 micron filter ratio determined on 1 liter of filtrate under 40 psi of pressure. Specific materials listed as active improved injectivity through Millipore filters; i.e., significant activity:

$$R = \frac{\text{Filter Ratio With Chelant}}{\text{Filter Ratio Without Chelant}} \leqq 0.7$$

limited activity: $0.7 < R < 1.0$ no activity: $R \geqq 1.0$.

Note: FR→∞ when <1000 ml of filtrate is collected in 600 sec.

TABLE II

Effect of Citric Treatment on Filterability: Ca (+2)
500 ppm Xanthan in 500 ppm NaCl

| Entry No. | ppm Ca (+2) | [1]ppm Citric Acid | 1.2 micron Filter Ratio | 1000 ml Flow Time |
|---|---|---|---|---|
| 1 | 1000 | — | 2.03 | 93 sec |
| 2 | 1000 | 1000 | 1.45 | 98 sec |
| 3 | 1000 | 3000 | 1.27 | 51 sec |
| 4 | 1000 | 5000 | 1.13 | 55 sec |

[1]Added as trisodium citrate dihydrate

EXAMPLE 2

Citric Treatment of Dilute Xanthan Solutions Containing Fe (+3)

Test solutions were prepared and analyzed according to the procedure of Example 1 by substituting the cation Fe (+3) for the Ca (+2) of Example 1. $FeCl_3.6H_2O$ was added to the 500 ppm NaCl dilution brine to give Fe (+3) levels of 1, 2, 5, 10 and 100 ppm.

TABLE III

Effect of Citric Treatment on Filterability: Fe (+3)
500 ppm Xanthan in 500 ppm NaCl

| Entry No. | ppm Fe (+3) | [1]ppm Citric Acid | [2]1.2 micron Filter Ratio | 1000 ml Flow Time |
|---|---|---|---|---|
| 1 | — | — | 1.17 | 68 sec |
| 2 | 1 | — | 1.17 | 73 sec |
| 3 | 2 | — | | 150 ml/600 sec |
| 4 | 5 | — | | <50 ml/600 sec |
| 5 | 10 | 5 | 1.23 | 41 sec |
| 6 | 100 | 135 | 1.23 | 58 sec |

[1]Added as trisodium citrate dihydrate
[2]One liter of filtrate required to obtain filter ratio value. If one liter not collected in 600 sec, test discontinued and collected volume reported.

Without citric treatment, precipitation of iron complexes from 500 ppm xanthan solutions containing 100 ppm Fe (+3) were observed. Addition of 135 ppm citric acid (as trisodium citrate dihydrate) to the brine prevented iron precipitation and restored Millipore filterability (Entry 6, Table III).

EXAMPLE 3

Citric Treatment of Dilute Xanthan Solutions Containing Mg (+2), Sr (+2), and Ba (+2)

Test solutions were prepared and analyzed according to the procedure of Example 1 by substituting individually the cations Mg (+2), Sr (+2), and Ba (+2) for that of Example 1. $MgCl_2.6H_2O$, $SrCl_2.6H_2O$, and $BaCl_2.2H_2O$ were each added to the 500 ppm NaCl dilution brine to give Mg (+2), Sr (+2), and Ba (+2) levels of 100–1000 ppm, 1500 ppm, and 1500 ppm, respectively.

TABLE IV

Effect of Citric Treatment on Filterability: Mg (+2), Sr (+2), and Ba (+2)
500 ppm Xanthan in 500 ppm NaCl

| Entry No. | Cation | ppm Cation | [1]ppm Citric Acid | 1.2 micron Filter Ratio | 1000 ml Flow Time |
|---|---|---|---|---|---|
| 1 | Mg (+2) | 100 | — | 1.79 | 57 sec |
| 2 | Mg (+2) | 100 | 100 | 1.19 | 50 sec |
| 3 | Mg (+2) | 1000 | — | | [2]350 ml/600 sec |
| 4 | Mg (+2) | 1000 | 1000 | 9.52 | 250 sec |
| 5 | Mg (+2) | 1000 | 3000 | 1.44 | 81 sec |
| 6 | Sr (+2) | 1500 | — | 1.66 | 87 sec |
| 7 | Sr (+2) | 1500 | 1500 | 1.43 | 64 sec |
| 8 | Ba (+2) | 1500 | — | 1.59 | 113 sec |
| 9 | Ba (+2) | 1500 | 1500 | 1.21 | 53 sec |

[1]Added as trisodium citrate dihydrate
[2]Solution plugged the filter membrane

EXAMPLE 4

Citric Treatment of Undiluted Xanthan Broth 1.45 grams of trisodium citrate dihydrate in 20 ml of distilled water was added to 18,900 grams of xanthan broth to give an equivalent citric acid concentration of 50 ppm; i.e., citric acid concentration of 50 ppm was prepared by adding 77 ppm trisodium citrate dihydrate. The citric treated xanthan sample in a 5 gallon polyethylene carbuoy was then vigorously agitated in a New Brunswick rotary shaker for 1 hour to insure proper mixing.

Using a Waring blender, 500 ppm xanthan test solutions were prepared by the aforementioned general test procedures using citric treated broth in brines I and II listed in Table I. 500 ppm xanthan solutions were also prepared using non-citric treated broth in Brines I and II containing 1000 ppm citric acid (added as trisodium citrate dihydrate) according to the procedures of Example 1. The pH of all test solutions was 6–7. The Brookfield viscosity was measured for all test samples at 6 rpm using a UL adapter (10 cps), and the 5 or 1.2 micron filter ratio was determined on 1 liter of filtrate under 40 psi pressure.

Table V illustrates the dramatic improvement in Millipore filterability when broth is citric treated. Addition of 50 ppm citric acid equivalent to broth (1 ppm in final test solution) provides much greater filterability improvement than addition of even higher levels (1000 ppm) to the xanthan solution after dilution of the broth. Some filterability enhancement is expected by citric treating broth with levels as low as 10 ppm (0.2 ppm final solution).

TABLE V

Filterability of 500 ppm xanthan solutions — Effect of point of addition of citric acid[a]

| Entry No. | Brine | Amount Citric Acid Present, ppm[b] | Addition Point[c] | Filter Pore Size, micron | Filter Ratio[d] | Flow Time sec.[e] |
|---|---|---|---|---|---|---|
| 1 | I | — | — | 5.0 | (120 ml) | — |
| 2 | I | 1 | Broth | 5.0 | 11.0 | 486 |
| 3 | I | 1000 | Solution | 5.0 | (270 ml) | — |
| 4 | II | — | — | 1.2 | (600 ml) | — |
| 5 | II | 1 | Broth | 1.2 | 2.1 | 145 |
| 6 | II | 1000 | Solution | 1.2 | 7.0 | 379 |

[a]Xanthan broth; chelating agent amount reported on citric acid bases - actually added as trisodium citrate dihydrate
[b]In final 500 ppm xanthan solution
[c]"Broth", citrate added to broth; "Solution", citrate added to diluted xanthan
[d]One liter of filtrate required to obtain filter ratio value. If one liter not collected in 600 sec, test discontinued and collected volume reported.
[e]Flow time for one liter of filtrate

EXAMPLE 5

Citric Treatment of Broth: Filterability Maintenance

In many cases, citric treatment of xanthan broth is more effective than treatment of dilute solutions in stabilizing and maintaining good filterability with time. Xanthan broth was citric treated according to the method of Example 4. Using this broth, 4×1100 gram samples of 500 ppm xanthan solutions in Brine III were prepared and analyzed according to the procedure of Example 1. 4×1100 gram samples using non-citric treated broth were also prepared in Brine III containing 100 ppm citric acid (added as trisodium citrate dihydrate). Each 1100 gram test solution was stabilized with 50 ppm Tretolite XC-215 biocide (5-chloro-2-methyl-4-isothiazolin-3-one) to inhibit microbial growth, and stored in 1200 cc sealed brown glass bottles. 1.2 micron filter ratios were obtained at day 0, 7, 14 and 21.

As is shown in FIG. I, citric treatment of broth (1 ppm in final test solution) was more effective in maintaining good injectivity than treating dilute solutions with even higher levels of citric acid (100 ppm). When broth was treated, 1.2 micron Millipore filterability was maintained for the entire 21 day stability study. Plugging of filter membranes occurred after seven days when dilute solutions were citric treated. Without citric treatment of broth or dilute solution, plugging occurred within one day.

EXAMPLE 6

Citric Treatment of Broth and Dilute Solution

By the procedure of Example 5, 500 ppm xanthan test solutions in Brine IV (Table I) were prepared using citric treated broth with and without citric acid (50 and 100 ppm) added to the brine. Each test solution was stabilized with 50 ppm Tretolite XC-215 biocide, and stored in sealed brown glass bottles. Filter ratios (1.2 micron) were obtained at day 0 and 1.

Table VI illustrates that citric treatment of broth and the diluted solution results in a dramatic enhancement in filterability. Data were taken at day 1 to show that citric treatment of broth and diluted solution also preserves good filterability.

TABLE VI

Filterability of 500 ppm Xanthan Solutions
Effect of Citric Treatment of Dilute Solutions and Broth[2]

| Entry No. | Brine[5] | Time | Amount Citric[1] Acid Added | 1.2 micron[3] Filter Ratio | Flow Time[4] |
|---|---|---|---|---|---|
| 1 | IV | Day 0 | 0 | 820 ml/600 sec. | |
| 2 | IV | 0 | 50 ppm | 2.30 | 44 sec. |
| 3 | IV | 0 | 100 ppm | 1.70 | 35 sec. |
| 4 | IV | 1 | 0 | 620 ml/600 sec. | |
| 5 | IV | 1 | 50 ppm | 1.60 | 31 sec. |
| 6 | IV | 1 | 100 ppm | 1.55 | 29 sec. |

[1]Added to final 500 ppm Xanthan solution.
[2]Broth contains 50 ppm citric acid
[3]One liter of filtrate required to obtain filter ratio value. If one liter not collected in 600 seconds, test discontinued and collected volume reported.
[4]Flow time for one liter of filtrate.
[5]Brine pH = 7.8

EXAMPLE 7

Citric Treatment of Broth Upon Long term Storage at Room Temperature 19,000 grams of citric treated (method: Example 4) and non-citric treated xanthan broth were stored in sealed 5 gallon polyethylene carbuoys at room temperature. Each broth sample contained 3000–4000 ppm formaldehyde as the biocide. Using the generalized test procedures, 500 ppm xanthan test solutions in 500 ppm total salt (9:1 NaCl/CaCl$_2$) were prepared and analyzed after 0–11 months of storage.

As illustrated in FIG. II, citric treated xanthan broth can be stored for at least 11 months with no apparent loss in filterability. After 4 months of storage, degradation in filterability was observed for non-citric treated xanthan broth. Citric treatment of xanthan broth protects filterability by chelating trace levels of iron and other multivalent cations in the broth, thereby preventing crosslinking of xanthan biopolymer and/or cells.

EXAMPLE 8

Alpha-Hydroxy Acids: Treatment of Dilute Xanthan Solutions Containing Ca (+2)

Test solutions were prepared and analyzed according to the procedure of Example 1 by substituting alpha-hydroxy acid chelants for that of Example 1, citric acid. Chelating agents were introduced as organic acids or sodium salts thereof, to give a concentration equivalent to 1000 ppm of the organic acid.

TABLE VIII

Benefits of Alpha-Hydroxy Acids on Filterability: Ca (+2)
500 ppm Xanthan in 500 ppm NaCl

| Entry No. | Chelant | [1]ppm Chelant | ppm Ca (+2) | [2]1.2 micron Filter Ratio | 1000 ml Flow Time | [3]R |
|---|---|---|---|---|---|---|
| 1 | None (Control) | — | 1000 | 2.7 | 95 sec | — |
| 2 | Glycolic Acid | 1000 | 1000 | 1.5 | 33 | 0.56 |
| 3 | Lactic Acid | 1000 | 1000 | 1.4 | 41 | 0.52 |
| 4 | Malic Acid | 1000 | 1000 | 1.3 | 35 | 0.48 |
| 5 | Tartaric Acid | 1000 | 1000 | 1.3 | 33 | 0.48 |
| 6 | Citric Acid | 1000 | 1000 | 1.4 | 45 | 0.52 |
| 7 | Isocitric Acid | 1000 | 1000 | 1.3 | 38 | 0.48 |
| 8 | Gluconic Acid | 1000 | 1000 | 1.9 | 66 | 0.70 |

[1]At pH 6-7, actually present as sodium salt
[2]Millipore Filter Lot #HOD62402A-1
$$R = \frac{\text{Filter Ratio with Chelant}}{\text{Filter Ratio without Chelant}},$$
see Example 1.

By the definition of Example 1, 2-6 carbon α-hydroxy acids in Table VII are active chelating agents. Seven carbon α-hydroxy acids were not tested, but are believed to be active by analogy to 6 carbon chelants tested.

EXAMPLE 9

Beta-Dicarbonyl Compounds: Treatment of Dilute Xanthan Solutions Containing Ca (+2)

Test solutions were prepared and analyzed according to the procedure of Example 1 by substituting beta-dicarbonyl compounds for that of Example 1, citric acid.

Acetoacetic acid (4-carbons) and 4–9 carbon atom beta-diketones and beta-ketocarboxylates will be found to be active when tested by the procedure of Example 1.

TABLE VIII

Benefits of Beta-Dicarbonyl Compounds on Filterability: Ca (+2)
500 ppm Xanthan in 500 ppm NaCl

| Entry No. | Chelant | ppm Chelant | ppm Ca (+2) | [1]1.2 micron Filter Ratio | 1000 ml Flow Time | R |
|---|---|---|---|---|---|---|
| 1 | Acetylacetone | 1000 | 1000 | 1.3 | 35 sec | 0.48 |
| 2 | None (Control) | — | 1000 | 2.7 | 95 | — |

[1]Millipore Filter Lot #HOD62402A-1

EXAMPLE 10

3-(or 5-)Hydroxy-4-pyrones: Treatment of Dilute Xanthan Solutions Containing Ca (+2)

Test solutions were prepared and analyzed according to the procedure of Example 1 by substituting hydroxy-pyrones for that of Example 1, citric acid.

4- and 2-pyrones related to kojic acid and having a hydroxyl group alpha to the carbonyl will be found to be active when tested by the procedures of Example 1.

TABLE IX

Benefits of 3-(or 5-)Hydroxy-4-pyrones on Filterability: Ca (+2)
500 ppm Xanthan in 500 ppm NaCl

| Entry No. | Chelant | ppm Chelant | ppm Ca (+2) | [1]1.2 micron Filter Ratio | 1000 ml Flow Time | R |
|---|---|---|---|---|---|---|
| 1 | None (Control) | — | 1000 | 2.7 | 95 sec | — |
| 2 | Kojic Acid | 1000 | 1000 | 1.6 | 45 sec | 0.59 |

[1]Millipore Filter Lot #HOD62402A-1

EXAMPLE 11

Citric Treatment of Broth and Dilute Solutions: Berea Core Studies

Improved injectivity of xanthan solutions has also been observed through Berea cores using citric treated broth with and without 1540 ppm trisodium citrate dihydrate added to the dilute solution. In core studies, solution resistance factor and residual resistance factor, which are defined below, are used as a measure of the injection properties of the xanthan solution. As the resistance factor *decreases,* solution filterability/injectivity improves. Methodology and supporting data are given below.

Xanthan broth was citric treated according to the method of Example 4. Using this broth, 500 ppm xanthan solutions were prepared in Brine V (Table I) with and without 1540 ppm trisodium citrate dihydrate, according to the procedure of Example 1. 500 ppm xanthan test solutions were also prepared in Brine V using non-citric treated broth.

Core testing was performed at room temperature (74° F.) on Berea sandstone cores 1-inch in diameter. Cores were chosen that had air permeability values of approximately 150 millidarcies. Steps of the core test follow.

1. Core was saturated under vaccum with the appropriate brine.
2. Brine was injected at a constant advance rate (20 feet/day) through the core until the pressure differential, $P_1$, across the core stabilized.
3. Xanthan solution was injected into the core at 20 feet/day for 40 pore volumes. The pressure drop, $P_2$, after 40 pore volumes was measured.
4. Brine was injected into the core at 20 feet/day until the pressure differential, $P_3$, stabilized.
5. Pressure differential versus pore volumes injected was recorded throughout the procedure and used to calculate the Resistance Factors via equations 1 and 2 listed below.

Equation 1: $RF = P_2 Q_1 / P_1 Q_2$,

Equation 2: $RRF = P_3 Q_1 / P_1 Q_3$, where
RF = solution resistance factor
RRF = residual resistance factor
$P_1$ = pressure drop, initial brine flood (step 2)
$P_2$ = pressure drop, polymer flood (step 3)
$P_3$ = pressure drop, final brine flood (step 4)
$Q_1$ = flow rate, initial brine flood
$Q_2$ = flow rate, polymer flood
$Q_3$ = flow rate, final brine flood.

Results from the core studies are summarized in Table X. Note citric treated xanthan solutions give lower resistance factors than solutions that were not citric treated, indicating improved injectivity.

TABLE X

Effect of Citric Treatment: Core Studies*

| Entry No. | Xanthan Broth | ppm Citric Added** to Brine V | RF | RRF |
|---|---|---|---|---|
| 1 | Not Citric Treated | None | 5.25 | 2.16 |
| 2 | Citric Treated | None | 4.46 | 2.06 |
| 3 | Citric Treated | 1540 | 3.43 | 0.91 |

*500 ppm Xanthan Solutions
**Trisodium citrate dihydrate basis

We claim:

1. A process for producing a stable xanthan solution with superior filterability and subterranean injectivity characteristics comprising admixing a fermentation broth, or a diluted form thereof, containing cells of an organism belonging to the genus Xanthomonas and at least about 100 ppm xanthan biopolymer with a chelating agent selected from:
- A. aliphatic alpha-hydroxy acids or salts thereof having from about 2-7 carbon atoms;
- B. aliphatic and aromatic beta-keto acids or salts thereof or beta-diketones having from about 4-9 carbon atoms; or
- C. 2- and 4-pyrones having a hydroxyl group alpha to the carbonyl and having 5 or 6 carbon atoms; said chelating agent being added in an amount of at least about 1.0 ppm of the total solution.

2. A mobility control solution for use in oil recovery produced according to claim 1.

3. The process of claim 1 in which said chelating agent is an aliphatic alpha-hydroxy acid having from about 2-7 carbon atoms.

4. The process of claim 2 in which said acid is citric acid.

5. The process of claim 1 wherein said chelating agent is employed in an amount of from about 1.0-1000 ppm of the total solution.

6. A method of enhancing oil recovery comprising employing as a mobility control solution in oil-bearing formation a mixture of xanthan biopolymer and a chelating agent prepared according to the process claim 1.

* * * * *